United States Patent
Krugly et al.

(10) Patent No.: US 10,103,635 B2
(45) Date of Patent: Oct. 16, 2018

(54) BUCK-BOOST CONTROLLER ACHIEVING HIGH POWER FACTOR AND VALLEY SWITCHING

(71) Applicant: Microchip Technology Incorporated, Chandler, AZ (US)

(72) Inventors: Simon Krugly, San Jose, CA (US); Alexander Mednik, Cambell, CA (US); Marc Tan, Sunnyvale, CA (US); Rohit Tirumala, Sunnyvale, CA (US)

(73) Assignee: Microchip Technology Inc., Chandler, AZ (US)

( * ) Notice: Subject to any disclaimer, the term of this patent is extended or adjusted under 35 U.S.C. 154(b) by 23 days.

(21) Appl. No.: 15/442,886

(22) Filed: Feb. 27, 2017

(65) Prior Publication Data
US 2017/0264203 A1   Sep. 14, 2017

Related U.S. Application Data

(60) Provisional application No. 62/307,056, filed on Mar. 11, 2016.

(51) Int. Cl.
*H02M 3/335* (2006.01)
*H02M 1/08* (2006.01)
(Continued)

(52) U.S. Cl.
CPC ......... *H02M 3/33507* (2013.01); *H02M 1/08* (2013.01); *H02M 1/4258* (2013.01);
(Continued)

(58) Field of Classification Search
None
See application file for complete search history.

(56) References Cited

U.S. PATENT DOCUMENTS

| | | | |
|---|---|---|---|
| 8,076,920 B1 | 12/2011 | Melanson | |
| 2011/0317459 A1* | 12/2011 | Kuebrich | H02M 1/4225 363/126 |
| 2015/0062977 A1 | 3/2015 | Lee et al. | |

FOREIGN PATENT DOCUMENTS

GB   2490918 A   11/2012

OTHER PUBLICATIONS

"Power Factor Correction (PFC) Handbook," Apr. 30, 2014, XP055221388, retrieved from http://www.onsemi.com/pub/Collateral/HBD853-D.PDF (pp. 16-18, 45-46; Figs. 1-13).

* cited by examiner

*Primary Examiner* — Adolf Berhane
*Assistant Examiner* — Henry Lee, III
(74) *Attorney, Agent, or Firm* — Burr & Forman LLP; Ryan M. Corbett

(57) ABSTRACT

A high power-factor buck-boost converter having a rectified low-frequency AC line voltage input and a DC output is provided. The converter may include a magnetic element, a controlled switch having a gate terminal and a drain terminal that is coupled to the magnetic element, a rectifier diode coupled to the magnetic element, an output smoothing capacitor coupled to the rectifier diode, and a control circuit having an output coupled to the gate terminal of the controlled switch for repeatedly turning the controlled switch off for a first time duration and on for a second time duration. The second time duration may be determined as a function of the first time duration immediately preceding the second time duration.

19 Claims, 8 Drawing Sheets

(51) Int. Cl.
*H02M 1/42* (2007.01)
*H02M 1/00* (2006.01)

(52) U.S. Cl.
CPC ............... *H02M 2001/0003* (2013.01); *H02M 2001/0009* (2013.01); *H02M 2001/0025* (2013.01); *H02M 2001/0054* (2013.01); *Y02B 70/126* (2013.01); *Y02B 70/1491* (2013.01)

BUCK-BOOST CONTROLLER ACHIEVING HIGH POWER FACTOR AND VALLEY SWITCHING

CROSS-REFERENCE TO RELATED APPLICATION

This application claims the benefit of U.S. Provisional Patent Application No. 62/307,056, filed on Mar. 11, 2016, which is incorporated herein by reference in its entirety.

TECHNICAL FIELD

The present disclosure generally relates to a high power factor buck-boost (flyback) converter and control circuit and method used therein.

SUMMARY

FIG. 1 depicts a related-art high power factor discontinuous conduction-mode (DCM) flyback converter for receiving input voltage $V_{IN}$ from a rectified AC line voltage source 100 and for delivering regulated DC output voltage \Tour to an output load 190. The flyback converter of FIG. 1 includes: a magnetic element 103 having a primary winding PRI, and a secondary winding SEC; a controlled switch 102 having a gate and a drain terminals; a rectifier diode 105; and an output filtering capacitor 106.

The flyback converter of FIG. 1 also includes a control circuit, which includes an integrator 107 having inverting and a non-inverting inputs for integrating the difference between $V_{OUT}$ and a reference voltage $V_{REF}$, and having an output for delivering the resulting integral voltage. The control circuit also includes a clock signal CLK, a source of linear ramp voltage $V_{RAMP}$, and a comparator 108 having an output, and inverting and non-inverting inputs for comparing the output voltage of the integrator 107 and the ramp voltage $V_{RAMP}$. The control circuit may also include a flip-flop circuit 109 for turning the controlled switch 102 on and off repeatedly at a high frequency rate, having an output Q coupled to the gate of the switch 102, a set input S for receiving the clock signal CLK and for toggling the output Q on when CLK is received, and a reset input R for receiving the output of the comparator 108 and for toggling the output Q off.

FIG. 2 illustrates the gate waveform 202 of the voltage at the gate of switch 102, and the drain voltage waveform 201 of the drain voltage $V_D$ at the drain of switch 102. The converter of FIG. 1 is operated at a fixed switching period $T_{SW}$ determined by the clock signal CLK. The time interval $T_{ON}$ represents the conductive state of the switch 102. The non-conductive state is represented by conduction of the diode 105 followed by a post-conduction oscillation of the drain voltage 201.

The integration time constant of the integrator 107 is selected much greater than a period of the rectified AC line voltage 100 and, therefore, the time interval $T_{ON}$ can be considered to be constant over an individual AC line cycle. The input current of a DCM flyback converter averaged over one switching cycle can be expressed as:

$$I_{IN} = \frac{V_{IN}}{L_{PRI}} \frac{T_{ON}^2}{T_{SW}} \quad (1)$$

where $R_{eff} = L_{PRI} \cdot T_{SW}/T_{ON}^2$ is the effective input resistance. The converter of FIG. 1 features natural unity power factor, since both $T_{ON}$ and $T_{SW}$ are fixed.

However, the natural high power factor flyback converter of FIG. 1 operates in deep discontinuous conduction mode. As a result, the switch 102 is stressed with high peak and RMS current causing high conduction and turn-off power losses. At high switching frequency (or low $T_{SW}$) and high voltage $V_D$ across the switch 102, turn-on power losses also become significant due to large parasitic energy stored in output capacitance of the switch 102 and other parasitic capacitances.

FIG. 3 shows another related-art high power factor discontinuous conduction-mode (DCM) flyback converter including all elements of the converter of FIG. 1, except wherein the clock signal CLK is replaced by a valley detector circuit 101 for detecting a post-conduction oscillation valley of the drain voltage 201 and for triggering the set input S to turn the switch 102 on when the valley is detected. This minimum-voltage valley switching is illustrated by a drain voltage waveform 210 of the switch 102 shown in FIG. 4.

The converter of FIG. 3 achieves improved efficiency compared to the converter of FIG. 1 due to the smallest peak and RMS current possible for a DCM converter and due to turning the switch 102 on at minimum possible voltage across it. However, the switching period $T_{SW}$ becomes variable over the AC line cycle of the input voltage 100, causing non-constant effective input resistance $R_{eff}$ and, therefore, distortion of input current. Hence, a control circuit is needed to overcome the deficiencies of constant-$T_{ON}$ control in the converter of FIG. 3.

According to an aspect of one or more exemplary embodiments, there is provided a high power-factor buck-boost converter for receiving input voltage from a rectified AC line voltage source and for delivering regulated DC output voltage to an output load that may include a magnetic element, a controlled switch having a gate terminal and a drain terminal that is coupled to the magnetic element, a rectifier diode coupled to the magnetic element, an output smoothing capacitor coupled to the rectifier diode, and a control circuit having an output coupled to the gate terminal of the controlled switch for repeatedly turning the controlled switch off for a first time duration and on for a second time duration. The second time duration may be determined as a function of the first time duration immediately preceding the second time duration.

The high power-factor buck-boost converter may also include a valley detection circuit configured to detect a post-conduction oscillation valley of a voltage at the drain terminal of the controlled switch, wherein the valley detection circuit may output a control signal, which may be used by the control circuit to control the controlled switch. The control circuit may cause the controlled switch to turn on once the control signal is received from the valley detection circuit.

The control circuit may turn the controlled switch on no sooner than when the rectifier diode becomes reverse-biased. The control circuit may determine the second time duration such that the quotient of the square of the second time duration and the sum of the first time duration and the second time duration is substantially constant over a cycle of the rectified AC line voltage.

According to an aspect of one or more exemplary embodiments, the high power-factor buck-boost converter may include an error detector circuit configured to receive as inputs an output voltage from the output smoothing capacitor and a reference voltage, and output a difference voltage that is equal to the difference between the output voltage and the reference voltage. The control circuit may use the difference voltage to determine the first time duration and the second time duration. The high power-factor buck-boost converter may also include an integrator circuit configured to generate a control voltage that is a time integral of the difference voltage, wherein, the control circuit may determine the first time duration and second time duration based on the control voltage.

According an aspect of one or more exemplary embodiments, the high power-factor buck-boost converter may also include a current sense circuit configured to measure an output current of the high power-factor buck-boost converter and output a sense voltage that is proportional to a measured output current of the high power-factor buck-boost converter. The error detector circuit may be configured to receive as inputs the sense voltage, and a reference voltage. The error detector circuit may be configured to output a difference voltage that is equal to the difference between the sense voltage and the reference voltage.

According to yet another aspect of one or more exemplary embodiments, the high power-factor buck-boost converter may include an analog differential integrator configured to receive as inputs an output voltage from the output smoothing capacitor and a reference voltage, and output a difference voltage that is equal to the difference between the output voltage and the reference voltage, wherein the analog differential integrator is configured to generate a control voltage that is a time integral of the difference voltage.

According to still another aspect of one or more exemplary embodiments, the control circuit may include a flip-flop circuit configured to turn the controlled switch on and off repeatedly at a high frequency rate, a controlled ramp generator configured to generate a linear voltage ramp having a slew rate that is proportional to the control voltage, a fixed ramp generator configured to generate a quadratic voltage ramp having a slew rate that is proportional to a time duration of an active state of an output of the flip-flop circuit, and a comparator circuit configured to compare the linear voltage ramp and the quadratic voltage ramp.

The fixed ramp generator may reset the quadratic ramp voltage to an initial level in response to the output of the flip-flop circuit entering an inactive state. The comparator circuit may include an output that is coupled to a reset input of the flip-flop circuit, wherein the output of the comparator circuit may be configured to terminate the active state of the output of the flip-flop circuit and reset the linear voltage ramp to an initial level in response to the quadratic voltage ramp exceeding the linear voltage ramp.

According to yet another aspect of one or more exemplary embodiments, the high power-factor buck-boost converter may include a combined signal generator configured to receive the control voltage and generate an output voltage, and a comparator circuit configured to compare the output voltage generated by the combined signal generator and an initial voltage level. Then output of the comparator circuit may be coupled to a reset input of the combined signal generator to reset the output voltage of the combined signal generator to the initial voltage level, and the combined signal generator may include an input that is coupled to an output of the flip-flop circuit.

According to another aspect of one or more exemplary embodiments, there is provided a method of achieving a high power factor in a DCM buck-boost converter. The method may include turning a controlled switch of the buck-boost converter off; generating a linear signal ramp; determining whether a magnetic element that is coupled to the controlled switch is in a discontinuous conduction mode; in response to determining that the magnetic element is in a discontinuous conduction mode, determining whether a time duration of a non-conductive state of the controlled switch has reached an end of the non-conductive state; in response to determining that the time duration of the non-conductive state of the controlled switch has reached the end of the non-conductive state, turning on the controlled switch; generating a quadratic signal ramp; determining whether the quadratic signal ramp exceeds the linear signal ramp; and in response to determining that the quadratic signal ramp exceeds the linear signal ramp, turning the controlled switch off.

According to still another aspect of one or more exemplary embodiments, there is provided a method of achieving a high power factor in a DCM buck-boost converter. The method may include turning a controlled switch of the buck-boost converter off; determining whether a magnetic element that is coupled to the controlled switch is in a discontinuous conduction mode; in response to determining that the magnetic element is in a discontinuous conduction mode, determining whether a time duration of a non-conductive state of the controlled switch has reached an end of the non-conductive state; in response to determining that the time duration of the non-conductive state of the controlled switch has reached the end of the non-conductive state, computing a time duration of a conductive state of the controlled switch as a function of the time duration of the non-conductive state.

According to an aspect of one or more exemplary embodiments, there is provided a high power-factor buck-boost converter that may include a magnetic element, a controlled switch having a gate terminal and a drain terminal that is coupled to the magnetic element, a rectifier diode coupled to the magnetic element, an output smoothing capacitor coupled to the rectifier diode, and a control circuit having an output coupled to the gate terminal of the controlled switch for repeatedly turning the controlled switch off for a first time duration, turning the controlled switch on for a second time duration immediately following the first time duration, and turning the controlled switch on for a third time duration immediately preceding the first time duration. The first time duration may include a time duration of a non-conductive state of the rectifier diode, and the second time duration may be determined as a function of the third time duration and the time duration of a non-conductive state of the rectifier diode.

The control circuit may generate a fourth time duration as a product of the third time duration and the quotient of the input voltage and the output voltage. The control circuit may determine the second time duration such that the quotient of the square of the second time duration and the sum of the fourth time duration, the time duration of a non-conductive state of the rectifier diode, and the second time duration is substantially constant over a cycle of the rectified AC line voltage.

The magnetic element may include a primary winding and a secondary winding having a turns ratio. The control circuit may generate the fourth time duration as a product of the third time duration and the quotient of the input voltage and the output voltage reflected to the primary winding by the turns ratio.

DETAILED DESCRIPTION OF EXEMPLARY EMBODIMENTS

Figure 1:
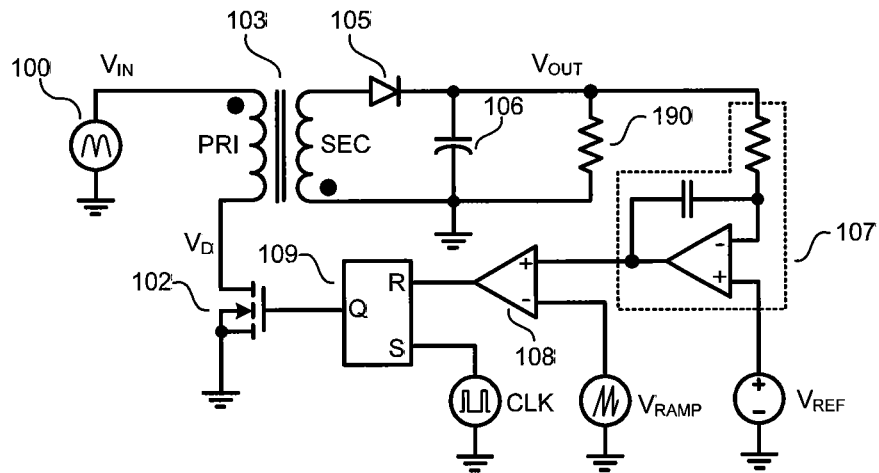
FIG. 1 illustrates flyback converter according to the related art.
Figure 2:
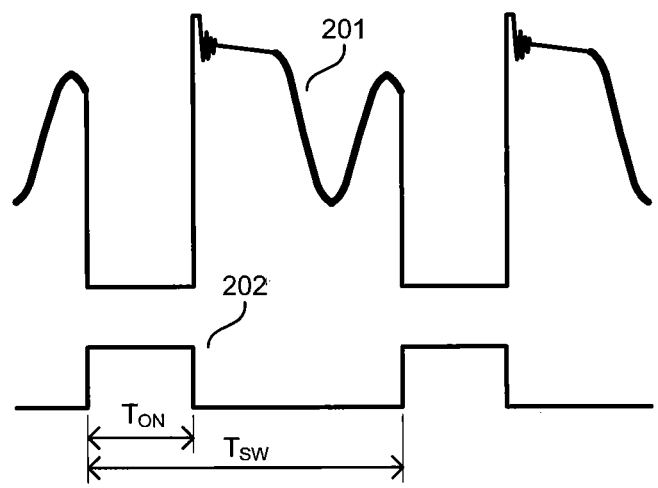
FIG. 2 illustrates voltage waveforms of the flyback converter shown in FIG. 1.
Figure 3:
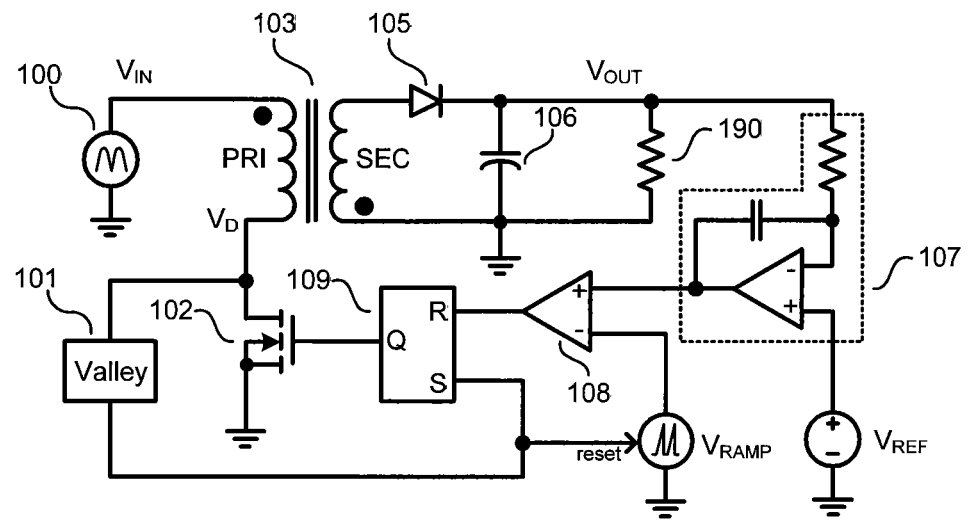
FIG. 3 illustrates another flyback converter according to the related art.
Figure 4:
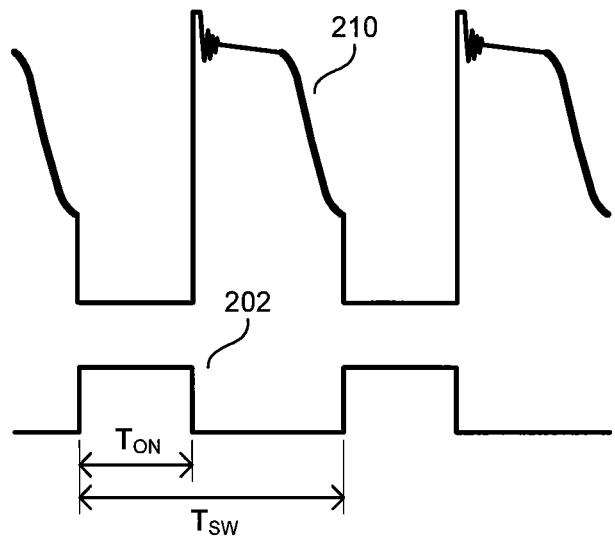
FIG. 4 illustrates voltage waveforms of the flyback converter shown in FIG. 3.

Reference will now be made in detail to the following exemplary embodiments, which are illustrated in the accompanying drawings, wherein like reference numerals refer to like elements throughout. The exemplary embodiments may be embodied in various forms without being limited to the exemplary embodiments set forth herein. Descriptions of well-known parts are omitted for clarity.

Figure 5:
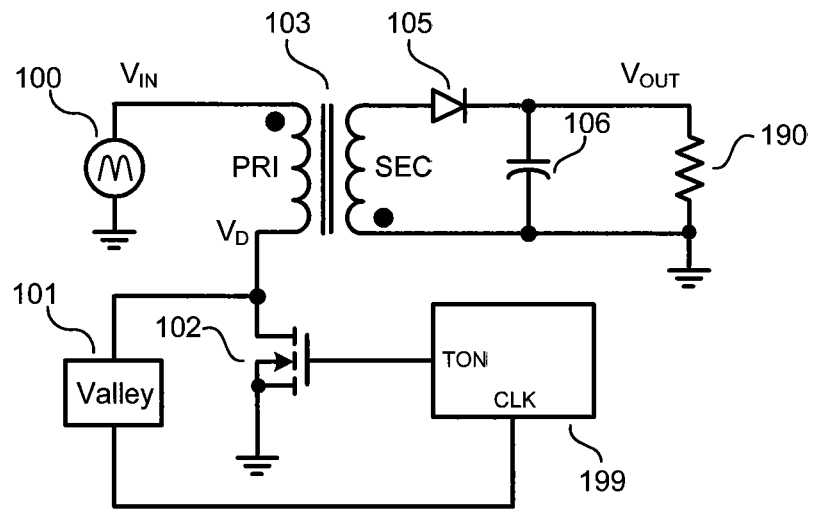
FIG. 5 illustrates a flyback converter according to an exemplary embodiment.

FIG. 5 shows a high power factor discontinuous conduction-mode (DCM) flyback converter according to an exemplary embodiment of the present disclosure. Referring to FIG. 5, the flyback converter of the exemplary embodiment may receive an input voltage $V_{IN}$ from a rectified AC line voltage source 100 and deliver a regulated DC output voltage $V_{OUT}$ to an output load 190. The flyback converter of FIG. 5 may include a magnetic element 103 having a primary winding PRI, and a secondary winding SEC; a controlled switch 102 having a gate terminal and a drain terminal; a rectifier diode 105; an output smoothing capacitor 106; and a control circuit 199 having a TON output coupled to the gate terminal of the switch 102 for turning the switch on and off repeatedly at a high frequency rate. The flyback converter of FIG. 5 may also include a valley detector 101. The control circuit 199 may also include a clock input CLK coupled to the valley detector 101.

Figure 5A:
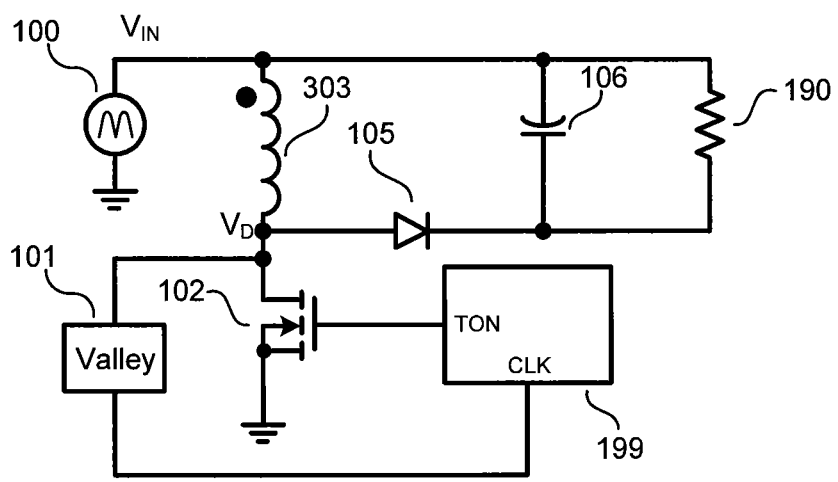
FIG. 5a illustrates a flyback converter according to another exemplary embodiment.

FIG. 5a depicts a converter according to another exemplary embodiment that is similar to the exemplary embodiment of FIG. 5, but wherein the magnetic element 103 is replaced by an inductor 303 having a single winding.

Figure 6:
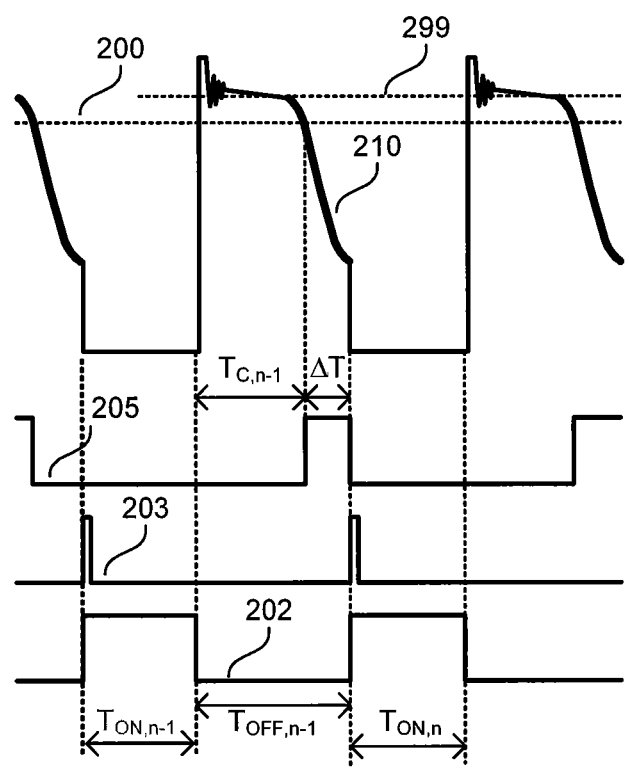
FIG. 6 is a waveform diagram illustrating the performance of the exemplary flyback converter of FIG. 5.

FIG. 6 illustrates operation of the exemplary flyback converter of FIG. 5.

Waveform 202 represents the voltage at the output TON controlling the gate of the switch 102, where $T_{ON,n}$ is a conductive state of the switch 102, $T_{OFF,n-1}$ is its non-conductive state immediately preceding $T_{ON,n}$. Waveform 210 represents an exemplary drain voltage $V_D$ of the switch 102.

In order to maintain discontinuous conduction-mode (DCM), the control circuit 199 permits a conductive state $T_{ON,n}$ of the switch 102 no sooner than the diode 105 becomes reverse-biased. This condition can be fulfilled by design, or using one of the known zero-current detection methods. Once the DCM operation is guaranteed, the switch 102 conducts for a time duration $T_{ON,n}$ computed in accordance with the following control law:

$$\frac{T_{ON,n}^2}{T_{OFF,n-1} + T_{ON,n}} = T_O \tag{2}$$

where $T_O$ is a time constant substantially fixed over a cycle of the rectified AC line voltage.

As shown in equation (2), the control law is iterative, since $T_{ON,n}$ in any given switching cycle is determined by $T_{OFF,n-1}$ in a preceding cycle, which, in turn, is an explicit function of $T_{ON,n-1}$. Moreover, a direct substitution of $T_{OFF,n-1}$ with $(m_R^{-1} T_{ON,n-1} + \Delta T)$ can be made in the control law equation (2), which yields equation (2a):

$$\frac{T_{ON,n}^2}{m_R^{-1} \cdot T_{ON,n-1} + \Delta T + T_{ON,n}} = T_O \tag{2a}$$

Substituting steady-state values of $T_{ON}$, $T_{OFF}$, and $T_{SW} = T_{ON} + T_{OFF}$ in equation (2), the following equation (3) is obtained:

$$\frac{T_{ON}^2}{T_{SW}} = T_O \tag{3}$$

Equation (3) guaranties unity power factor in a DCM flyback converter in spite of the individually varying $T_{ON}$ and $T_{SW}$. The corresponding effective resistance given by the equation (1) can now be expressed as $R_{eff} = L_{PRI}/T_O$. It is to be noted that, as long as DCM is guaranteed, the high power-factor control law of Equation (2) holds true regardless of a specific moment when a time $T_{ON,n}$ begins.

Equation (2) may be solved for $T_{ON,n}$ in a predictive way by computing it prior to a conductive state of the switch 102. This can be done by using one of the known iterative root-finding methods, bracketing or open, or by direct calculation of the root, as shown in Equation (4):

$$T_{ON,n} = \frac{T_O}{2} \cdot \left(1 + \sqrt{1 + \frac{4 T_{OFF,n-1}}{T_O}}\right) \tag{4}$$

With continued reference to FIG. 6, a voltage level 299 designates $V_D = V_{IN} + V_{OR}$, where $V_{OR} = n \cdot V_{IN}$, and $n = N_{PRI}/N_{SEC}$ is the PRI-to-SEC turn ratio of the magnetic element 103. Voltage level 200 designates $V_D = V_{IN} + k \cdot V_{OR}$, where k is a constant coefficient less than unity. Waveform 205 represents a time duration $\Delta T$ within $T_{OFF,n-1}$ where the drain voltage $V_D$ falls below the voltage level 200. The waveform 203 illustrates an exemplary signal at CLK of the control circuit 199 received from the valley detector 101.

In operation, the switch 102 turns on once the signal 203 is received at CLK. The switch 102 conducts for a time duration $T_{ON,n}$ computed in accordance with the equation (2). Predictive computing of $T_{ON,n}$ may require finite time. The control circuit 199 may use the time $\Delta T$ to perform this computation. In such case, the control circuit 199 may use a modified version of Equation (2), which is shown below in Equation (5):

$$\frac{T_{ON,n}^2}{(T_{C,n-1} + \Delta T) + T_{ON,n}} = T_O \qquad (5)$$

where $T_{C,n-1} = T_{OFF,n-1} - \Delta T$ is measured instead, and $\Delta T$ is assumed known. Alternatively, $\Delta T$ may be determined from preceding switching cycles.

Figure 7:
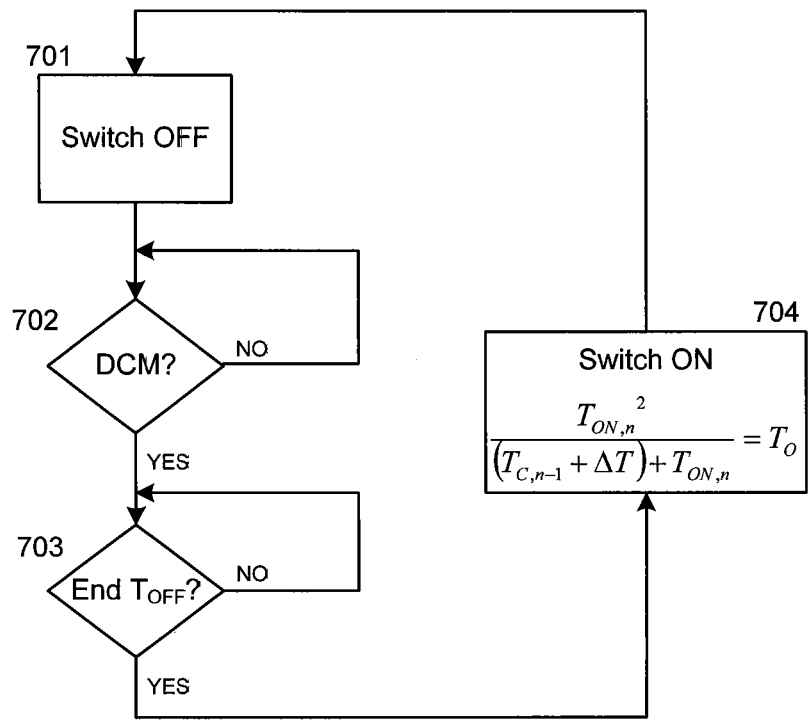
FIG. 7 is a flowchart illustrating a control method for a flyback converter according an exemplary embodiment.

FIG. 7 illustrates a control method according to an exemplary embodiment of the present disclosure for achieving high power factor in a DCM flyback converter. The method of the exemplary embodiment may include the steps of switching the switch 102 off at step 701. At step 702, it is determined whether the magnetic element is in a discontinuous conduction mode. If not, the method continues checking whether the magnetic element 103 is in a discontinuous conduction mode. Once it is determined that the magnetic element 103 is in a discontinuous conduction mode, at step 703 the method permits the end of the non-conductive state at an arbitrary moment determined by any known criterion. If the end of the non-conductive state has been reached, the method computes the required time duration of a conductive state of the switch 102 using Equation (2). Equation (2) can be solved by using one of the known iterative root-finding methods, bracketing or open, or by direct calculation of the root.

Figure 8:
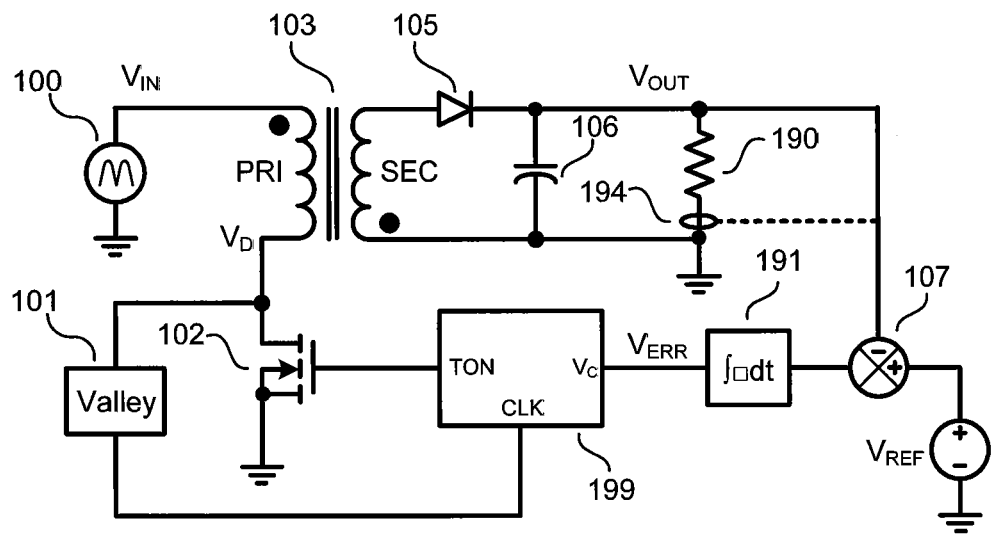
FIG. 8 illustrates a flyback converter according to another exemplary embodiment.

FIG. 8 shows a high power factor flyback converter of FIG. 5 that may additionally include an error detector 107 for receiving the output voltage $V_{OUT}$ and a reference voltage $V_{REF}$ and for generating a difference voltage $V_{REF} - V_{OUT}$ an integrator 191 for generating a time integral $V_{ERR}$ of the difference voltage, and wherein the control circuit 199 includes an additional input $V_C$ for receiving $V_{ERR}$.

The control circuit 199 of FIG. 8 may use the control law of Equation (5a) below:

$$\frac{T_{ON,n}^2}{T_{OFF,n-1} + T_{ON,n}} = \alpha \cdot V_{ERR} \qquad (5a)$$

where $\alpha$ is a constant coefficient. By using the control law of Equation (5a), the control circuit 199 may achieve regulation of the output voltage $V_{OUT}$ to the reference $V_{REF}$. Alternatively, the error detector 107 may receive voltage from a current sense element 194 proportional to measured output current of the flyback converter.

Figure 9:
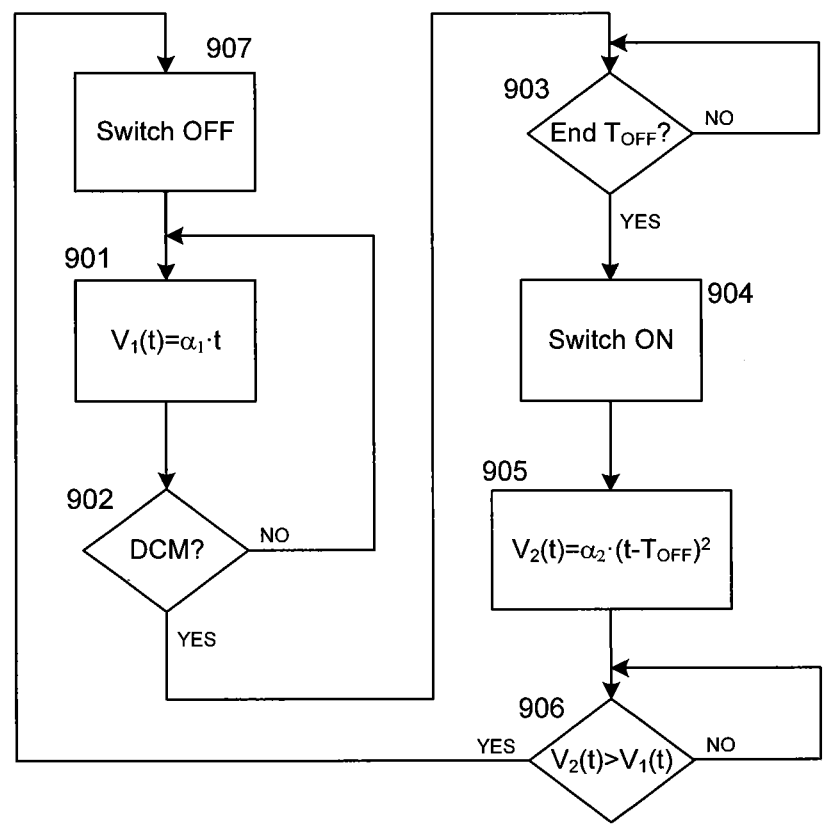
FIG. 9 is a flowchart illustrating a real-time control method for a flyback converter according to an exemplary embodiment.

As opposed to predictively computing $T_{ON,n}$, a real-time solution of Equation (2) is possible. FIG. 9 depicts a real-time control method according to an exemplary embodiment of the present disclosure for achieving high power factor in a DCM flyback converter. The method may include the following steps. At step 901, a linear signal ramp $V_1(t) = \alpha_1 \cdot t$ may be generated, where $\alpha_1$ is a constant coefficient, and 't' is the time variable having its initial value $t=0$ at a moment of a turn-off transition of the switch 102. At step 902, it is determined whether the magnetic element is in a discontinuous conduction mode. If not, the method generates the linear signal ramp in step 901, and continues checking whether the magnetic element 103 is in a discontinuous conduction mode. Once it is determined that the magnetic element 103 is in a discontinuous conduction mode, at step 903 the method permits the end of the non-conductive state at an arbitrary moment determined by any known criterion. If the duration of the non-conductive state of the switch 102 has reached the end, the switch 102 is turned on at step 904. At step 905, a quadratic signal ramp $V_2(t)$ is generated according to the following Equation (6):

$$V_2(t) = \alpha_2 \cdot (t - T_{OFF})^2 \qquad (6)$$

At step 906, it is determined whether the quadratic signal ramp $V_2(t)$ exceeds the linear signal ramp $V_1(t)$. Once it is determined that the quadratic signal ramp $V_2(t)$ exceeds the linear signal ramp $V_1(t)$, the switch 102 is turned off at step 907.

Figure 10:
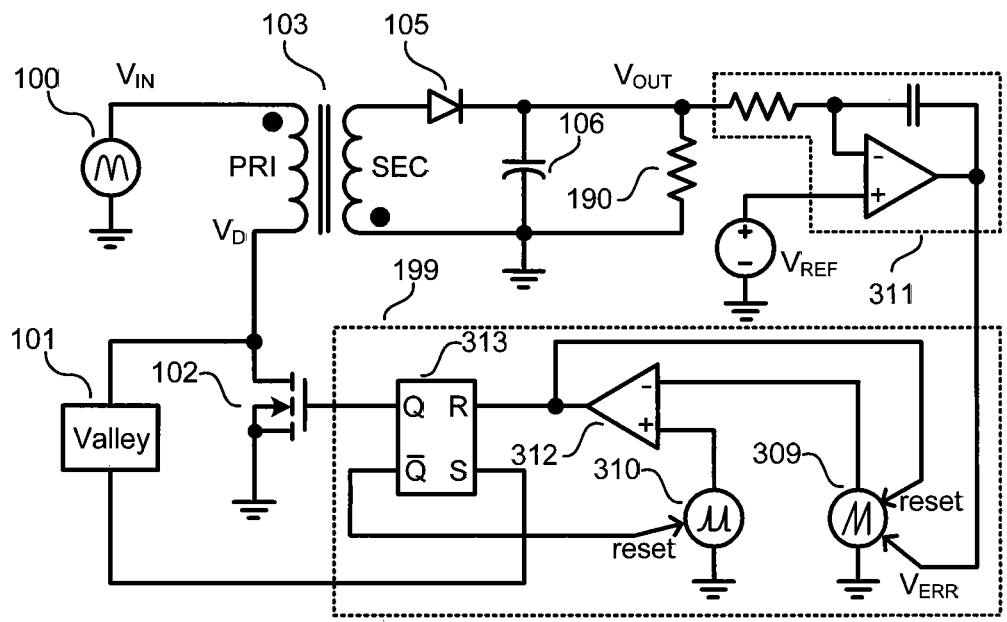
FIG. 10 illustrates a flyback converter according to yet another exemplary embodiment.

FIG. 10 depicts a high power factor flyback converter of FIG. 8, wherein the error detector 107 and the integrator 191 may be represented by an analog differential integrator circuit 311, and wherein the control circuit 199 may be an analog circuit including: a flip-flop circuit 313 for turning the controlled switch 102 on and off repeatedly at a high frequency rate, having an output Q, a set input S coupled to the valley detector 101 for activating the output Q, and a reset input R for deactivating the output Q; a controlled ramp generator 309 configured to generate a linear voltage ramp having a slew rate proportional to the output voltage $V_{ERR}$ of the integrator 311; a fixed ramp generator 310 configured to generate a quadratic voltage ramp having a slew rate proportional to the time duration of an active state of the output Q, and for resetting the ramp voltage 310 to its initial level once the output Q becomes inactive; and a comparator 312 that may have a differential pair of inputs for comparing the voltage ramps 309 and 310, and may include an output coupled to the reset input R of the flip-flop 313 for terminating an active state of Q and for resetting ramp voltage 309 to its initial level once ramp voltage 310 exceeds ramp voltage 309.

Figure 11:
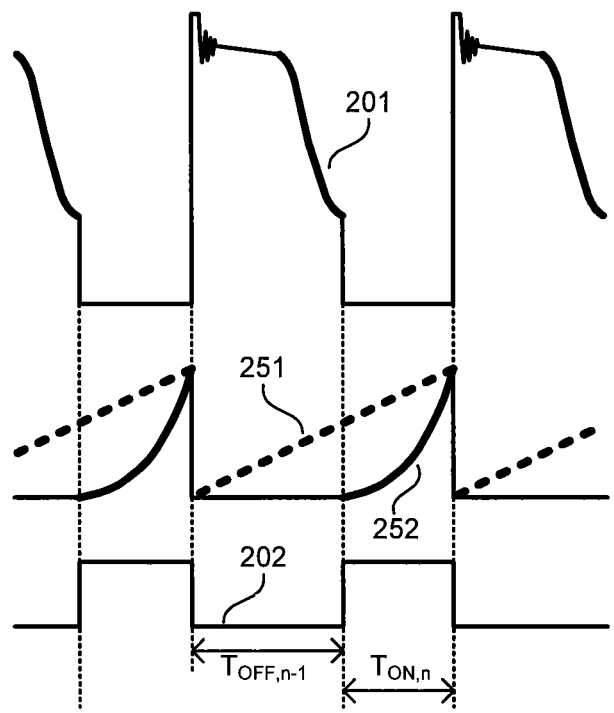
FIG. 11 is a waveform diagram illustrating the performance of the exemplary flyback converter of FIG. 10.

FIG. 11 illustrates the operation of the exemplary embodiment shown in FIG. 10. Referring to FIG. 11, waveform 201 is the drain voltage $V_D$ of the switch 102; waveform 202 is the voltage at the output Q of flip-flop circuit 313; and waveforms 251 and 252 represent the ramp voltages 309 and 310, respectively.

The ramp 251 begins with the time period $T_{OFF(n-1)}$ preceding each active state of the output Q, whereas the quadratic ramp 252 begins with the active state of the output Q. The active state of the output Q is terminated when the ramp voltage 252 exceeds the ramp voltage 251. The resulting control equation can be written as shown in Equation (7):

$$\alpha_1 \cdot T_{ON,n}^2 = \alpha_2 \cdot V_{ERR} \cdot (T_{OFF,n-1} + T_{ON,n}) \qquad (7)$$

where $\alpha_1$ and $\alpha_2$ are constant coefficients. Substituting $\alpha = \alpha_2/\alpha_1$ in Equation (7) yields Equation (5a).

Figure 12:
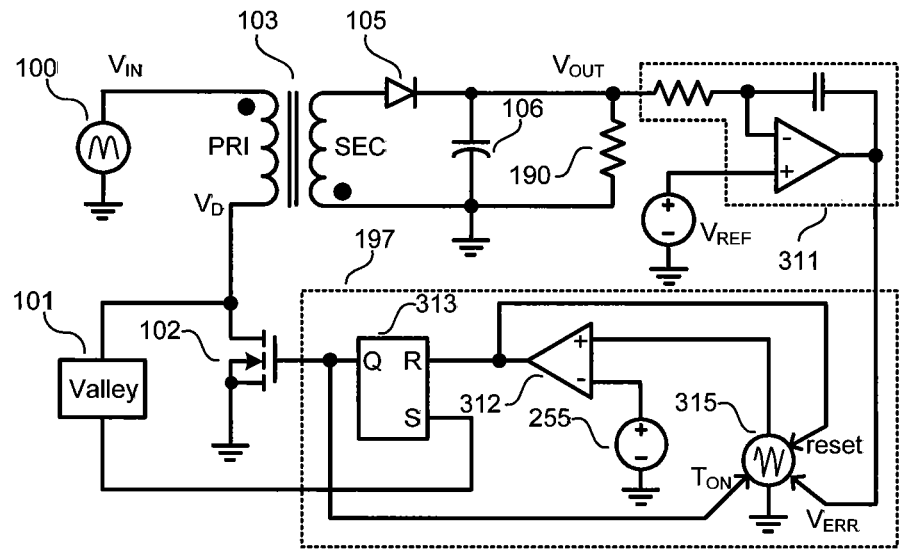
FIG. 12 illustrates a flyback converter according to yet another exemplary embodiment.

FIG. 12 depicts a high power factor flyback converter of FIG. 10, wherein the controlled ramp generator 309 and the fixed ramp generator 310 have been replaced with a single combined signal generator 315, and wherein the comparator 312 has a differential pair of inputs for comparing an output voltage of the signal generator 315 and an initial voltage level 255. The signal generator 315 may include an output coupled to the non-inverting input of the comparator 312; an input $T_{ON}$ coupled to the output Q of flip-flop circuit 313; a reset input coupled to the output of the comparator 312 for resetting the output of the generator 315 to an initial voltage level 255; and an input $V_{ERR}$ coupled to the output of the integrator 311.

Figure 13:
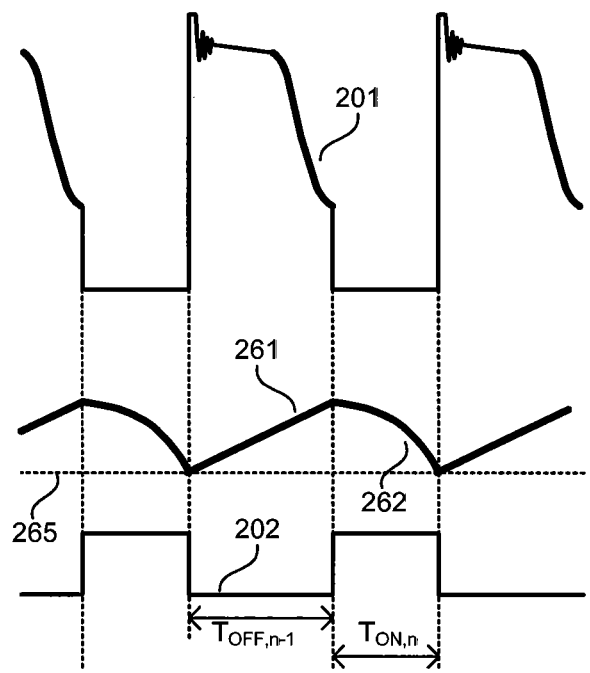
FIG. 13 is a waveform diagram illustrating the performance of the exemplary flyback converter of FIG. 12.

FIG. 13 illustrates the operation of the exemplary embodiment shown in FIG. 12. Referring to FIG. 13, waveform 201 is the drain voltage $V_D$ of the switch 102; a waveform 202 is the voltage at the output Q of flip-flop circuit 313; waveform 261 represent the output voltage of the generator 315; and a dotted line 265 designates the initial voltage level 255. The waveform 261 is composed as the difference voltage of the waveforms 251 and 252 of FIG. 11.

Although the inventive concepts of the present disclosure have been described and illustrated with respect to exemplary embodiments thereof, it is not limited to the exemplary embodiments disclosed herein and modifications may be made therein without departing from the scope of the inventive concepts.

What is claimed is:

1. A high power-factor buck-boost converter having a rectified low-frequency AC line voltage input and a DC output comprising:
   a magnetic element;
   a controlled switch having a gate terminal and a drain terminal that is coupled to the magnetic element;
   a rectifier device coupled to the magnetic element;
   an output smoothing capacitor coupled to the rectifier device; and
   a control circuit having an output coupled to the gate terminal of the controlled switch for repeatedly turning the controlled switch off for a first time duration and on for a second time duration;
   wherein the second time duration is determined as a function of the first time duration immediately preceding the second time duration;
   wherein the control circuit turns the controlled switch on no sooner than when the rectifier device becomes non-conductive.

2. The high power-factor buck-boost converter of claim 1, further comprising:
   a valley detection circuit configured to detect a post-conduction oscillation valley of a voltage at the drain terminal of the controlled switch;
   wherein the valley detection circuit outputs a control signal, which is used by the control circuit to control the controlled switch.

3. The high power-factor buck-boost converter of claim 2, wherein the control circuit causes the controlled switch to turn on once the control signal is received from the valley detection circuit.

4. The high power-factor buck-boost converter of claim 1, wherein the control circuit determines the second time duration such that the quotient of the square of the second time duration and the sum of the first time duration and the second time duration is substantially constant over at least one cycle of the rectified AC line voltage.

5. The high power-factor buck-boost converter of claim 1, further comprising an error detector circuit configured to receive as inputs an output voltage from the output smoothing capacitor and a reference voltage, and output a difference voltage that is equal to the difference between the output voltage and the reference voltage.

6. The high power-factor buck-boost converter of claim 5, wherein the control circuit uses the difference voltage to determine the first time duration and the second time duration.

7. The high power-factor buck-boost converter of claim 6, further comprising an integrator circuit configured to generate a control voltage that is a time integral of the difference voltage;
   wherein the control circuit determines the first time duration and the second time duration based on the control voltage.

8. The high power-factor buck-boost converter of claim 1, further comprising:
   a current sense circuit configured to measure an output current of the high power-factor buck-boost converter and output a sense voltage that is proportional to a measured output current of the high power-factor buck-boost converter; and
   an error detector circuit configured to receive as inputs the sense voltage and a reference voltage;
   wherein the error detector circuit is configured to output a difference voltage that is equal to the difference between the sense voltage and the reference voltage.

9. The high power-factor buck-boost converter of claim 1, further comprising an analog differential integrator configured to receive as inputs an output voltage from the output smoothing capacitor and a reference voltage, and output a difference voltage that is equal to the difference between the output voltage and the reference voltage;
   wherein the analog differential integrator is configured to generate a control voltage that is a time integral of the difference voltage.

10. The high power-factor buck-boost converter of claim 9, wherein the control circuit comprises:
    a flip-flop circuit configured to turn the controlled switch on and off repeatedly at a high frequency rate;
    a controlled ramp generator configured to generate a linear voltage ramp having a slew rate that is proportional to the control voltage;
    a fixed ramp generator configured to generate a quadratic voltage ramp having a slew rate that is proportional to a time duration of an active state of an output of the flip-flop circuit; and
    a comparator circuit configured to compare the linear voltage ramp and the quadratic voltage ramp.

11. The high power-factor buck-boost converter of claim 10, wherein the fixed ramp generator resets the quadratic ramp voltage to an initial level in response to the output of the flip-flop circuit entering an inactive state.

12. The high power-factor buck-boost converter of claim 10, wherein the comparator circuit includes an output that is coupled to a reset input of the flip-flop circuit;
    wherein the output of the comparator circuit is configured to terminate the active state of the output of the flip-flop circuit and reset the linear voltage ramp to an initial level in response to the quadratic voltage ramp exceeding the linear voltage ramp.

13. The high power-factor buck-boost converter of claim 9, wherein the control circuit comprises:
    a flip-flop circuit configured to turn the controlled switch on and off repeatedly at a high frequency rate;
    a combined signal generator configured to receive the control voltage and generate an output voltage having an initial voltage level; and
    a comparator circuit configured to compare the output voltage generated by the combined signal generator and the initial voltage level.

14. The high power-factor buck-boost converter of claim 13, wherein an output of the comparator circuit is coupled to a reset input of the combined signal generator to reset the output voltage of the combined signal generator to the initial voltage.

15. A method of achieving a high power factor in a DCM buck-boost converter, the method comprising:
    turning a controlled switch of the buck-boost converter off;
    generating a linear signal ramp;

determining whether a magnetic element that is coupled to the controlled switch is in a discontinuous conduction mode;

in response to determining that the magnetic element is in a discontinuous conduction mode, determining whether a time duration of a non-conductive state of the controlled switch has reached an end of the non-conductive state;

in response to determining that the time duration of the non-conductive state of the controlled switch has reached the end of the non-conductive state, turning on the controlled switch;

generating a quadratic signal ramp;

determining whether the quadratic signal ramp exceeds the linear signal ramp; and in response to determining that the quadratic signal ramp exceeds the linear signal ramp, turning the controlled switch off.

16. A method of achieving a high power factor in a DCM buck-boost converter, the method comprising:

turning a controlled switch of the buck-boost converter off;

determining whether a magnetic element that is coupled to the controlled switch is in a discontinuous conduction mode;

in response to determining that the magnetic element is in a discontinuous conduction mode, determining whether a time duration of a non-conductive state of the controlled switch has reached an end of the non-conductive state;

in response to determining that the time duration of the non-conductive state of the controlled switch has reached the end of the non-conductive state, computing a time duration of a conductive state of the controlled switch as a function of the time duration of the non-conductive state.

17. A high power-factor buck-boost converter having a rectified low-frequency AC line voltage input and a DC output comprising:

a magnetic element;

a controlled switch having a gate terminal and a drain terminal that is coupled to the magnetic element;

a rectifier diode coupled to the magnetic element;

an output smoothing capacitor coupled to the rectifier diode; and a control circuit having an output coupled to the gate terminal of the controlled switch for repeatedly turning the controlled switch off for a first time duration, turning the controlled switch on for a second time duration immediately following the first time duration, and turning the controlled switch on for a third time duration immediately preceding the first time duration;

wherein the first time duration includes a time duration of a non-conductive state of the rectifier diode;

wherein the second time duration is determined as a function of the third time duration and the time duration of a non-conductive state of the rectifier diode.

18. The high power-factor buck-boost converter of claim 17, having an instantaneous output voltage and an instantaneous input voltage;

wherein the control circuit generates a fourth time duration as a product of the third time duration and the quotient of the instantaneous input voltage and the instantaneous output voltage; and wherein the control circuit determines the second time duration such that the quotient of the square of the second time duration and the sum of the fourth time duration, the time duration of a non-conductive state of the rectifier diode, and the second time duration is substantially constant over at least one cycle of the rectified AC line voltage.

19. The high power-factor buck-boost converter of claim 18, wherein the magnetic element includes a primary winding and a secondary winding having a turns ratio; and wherein the control circuit generates the fourth time duration as a product of the third time duration and the quotient of the input voltage and the output voltage reflected to the primary winding by the turns ratio.

\* \* \* \* \*